UNITED STATES PATENT OFFICE.

EDWIN M. CHAFFEE, OF PROVIDENCE, RHODE ISLAND.

IMPROVEMENT IN THE MANUFACTURE OF WATER-PROOF HOSE.

Specification forming part of Letters Patent No. 58,377, dated October 2, 1866.

*To all whom it may concern:*

Be it known that I, EDWIN M. CHAFFEE, of Providence, in the county of Providence and State of Rhode Island, have invented a new and useful Improvement in the Manufacture of Water-Proof Hose; and I do hereby declare that the following is a full, clear, and exact description thereof, which will enable others skilled in the art to make and use the same, reference being had to the accompanying drawings, forming part of this specification.

This invention refers to a new method of lining woven and seamless hose on the inner surface with india-rubber or gutta-percha, or other flexible and vulcanizable gums.

In carrying out my invention I first cement the inside of the hose by putting a quantity of india-rubber cement into one end of the hose, which is then spread upon its inner surface by drawing or forcing a piston or ball of wood or other suitable material, and of suitable size, through the hose by means of a rod or cord, and thereby the cement is carried through the hose, leaving a thin coating upon its inner surface. This operation is to be repeated after each coat is dry until the rubber coating is sufficiently thick.

If more than four to six coats are required, I prefer to repeat the above-described operation but once or twice, and then insert a lining of thin sheet-rubber, which is done as follows: A strip of sheet-rubber of sufficient length and width is cemented together at the edges, making a hose-lining a little smaller than the hose to be lined. The inside of this lining is to be varnished with shellac or other varnish, or otherwise made non-adhesive, before making up, to prevent the inner surfaces from sticking together when it collapses, as of course it does collapse in making up and afterward. Upon one end of this lining a piece of cloth is cemented, to which a cord is attached, by which it is drawn in a collapsed state into a tin or other tube. This tube, which is about a quarter of an inch less in diameter than the hose to be lined, is then forced or drawn into the hose, carrying the lining with it, which is then held or secured at one end, while the tin tube is withdrawn, leaving the lining within the hose. The hose is then collapsed upon the lining, and a hand-roll about one inch long is passed over and along the center of the collapsed or flattened hose, taking care not to approach the edges. After this the hose is turned up edgewise and collapsed or flattened the other way, bringing fresh surfaces together in a position to be rolled, as before, and then the rolling is completed by inserting within the lined hose a piece of gas-pipe or other rod, and continue the rolling to completion, which causes the lining to adhere firmly to the inside of the cemented hose. Instead of collapsing the woven hose to bring the surfaces of the lining and cemented hose together, I bring them together by filling the lining with air or other fluid or liquid by means of a force-pump or otherwise, which stretches the lining to the size of the hose and causes it to adhere to the inside sufficiently to enable me to insert the gas-pipe or rod and complete the rolling, as before; or the rolling may be completed by collapsing the hose in various positions and roll with a hand-roll or pass it between pressure-rolls.

After cementing the hose upon the inside, as before described, it should be secured against collapsing while the cement is drying, which is best done by laying it in a trough which is too narrow to allow the hose to spread laterally sufficiently to collapse; and the coating or cementing is best performed as the hose lies in the trough.

A rubber lining may also be inserted in the following manner: A rod which is a little smaller than the hose should have the lining formed upon it, with the adhesive side next to the rod; and the outside may be varnished or otherwise made non-adhesive. One end of the lining should be turned over, like a hem, about one inch, but not cemented, thus bringing so much of the adhesive side out; then insert that much of the rod and lining into the end of the cemented hose, and by pressure cement the lining (so much as is turned over) and hose together, and then, by forcing the rod farther in the lining becomes turned inside out, and in this way the rod may be passed entirely through the hose, leaving the lining within it, which may be inflated and rolled, as before.

To facilitate the entrance of the rod into the hose it should first be inclosed with its rubber covering within a tin or other tube, and the end of the tube where the lining connects with the hose, as before described, should also temporarily connect at the same place with the hose air-tight, so that when air is forced into the tin tube (the other end of the tube being closed) and occupies the space between it and the lining which covers the rod it will help to force the rod into the hose, and at the same time inflate the lining as it leaves the rod, being turned inside out, and causing it to adhere to the inside of the hose. In this way the rod passes entirely through the hose, and as it moves along the lining is transferred from the rod to the hose.

Water instead of air may be used, which will float the rod in.

As a substitute for the tin tube in the first method, I propose to use glazed cloth or strong paper to wrap the rubber lining in, and draw both together into the hose in a collapsed state, and afterward withdraw the wrapper. The wrapper may have its edges sewed or cemented together, thus making a tube or hose of itself, to be used instead of the wrapper above mentioned.

When the lining of the hose is long and thin, it is liable to be stretched or broken on withdrawing the tube or its equivalent, to prevent which I cement longitudinally, about half an inch apart, fine twine or sewing-thread to the under side of the collapsed lining before it is drawn into the tin or other tube, which strengthens it for that purpose, and for the purpose of withdrawing the tube also.

One advantage which hose possesses when prepared in this way is, it takes more naturally the collapsed form in which it is woven, and therefore occupies the least possible space when wound upon the reel. Besides, this method prevents the liability to damage to which the hose is subjected when coated upon the outside and afterward turned outside in, as is sometimes done.

What I claim as my invention, and desire to secure by Letters Patent, is—

1. The method, substantially as herein described, of lining hose of woven or other fabric with india-rubber, gutta-percha, or other flexible and vulcanizable gum on the inside by means substantially such as set forth, or by any other equivalent means.

2. The use of the tin tube or its equivalent, for the purpose herein described.

3. Strengthening the lining by the longitudinal threads or their equivalent, substantially as described.

EDWIN M. CHAFFEE.

Witnesses:
JOHN E. CHADWICK,
JOSEPH L. PITMAN.